United States Patent [19]

Grierson

[11] Patent Number: 5,059,042
[45] Date of Patent: Oct. 22, 1991

[54] BEARING RETAINER FOR A VACUUM CLEANER MOTOR

[75] Inventor: Keith J. Grierson, Lexington, Ky.

[73] Assignee: Whirlpool Corporation, Benton Harbor, Mich.

[21] Appl. No.: 459,680

[22] Filed: Jan. 2, 1990

[51] Int. Cl.$^5$ .......................................... F16C 43/00
[52] U.S. Cl. ................................. 384/537; 384/903
[58] Field of Search ............. 384/903, 537, 585, 439, 384/535, 581, 582, 536; 310/90, 89, 91

[56] References Cited

U.S. PATENT DOCUMENTS

| | | | |
|---|---|---|---|
| 979,317 | 12/1910 | Lockwood | 384/569 |
| 1,906,521 | 5/1933 | Boden | 384/585 |
| 2,857,974 | 10/1958 | Heller | 384/536 |
| 3,900,234 | 10/1975 | Roddy | 310/90 |
| 4,236,767 | 12/1980 | Feldle | 308/187.1 |
| 4,339,159 | 7/1982 | Miller | 308/20 |
| 4,364,615 | 12/1982 | Euler | 308/236 |
| 4,392,694 | 7/1983 | Reynolds | 384/536 |
| 4,429,927 | 2/1984 | Kawabata | 308/236 |
| 4,512,673 | 4/1985 | Condon et al. | 384/569 |
| 4,545,627 | 10/1985 | Nakamura et al. | 384/585 |
| 4,710,037 | 12/1987 | Newberg | 384/537 |

FOREIGN PATENT DOCUMENTS 0889534  9/1953  Fed. Rep. of Germany ...... 384/585

OTHER PUBLICATIONS

Power Transmission Design; 04/1985; U.S.A. Tolerance Rings; West Trenton, N.J.; pp. 3–23, 33–35.
NSK Product Service Guide; 07/1989; NSK Corp.; Ann Arbor, Mich.; pp. 1–239.

Primary Examiner—R. Skudy
Attorney, Agent, or Firm—Thomas J. Roth; Stephen D. Krefman; Thomas E. Turcotte

[57] ABSTRACT

An improved bearing retainer for a vacuum cleaner including a plurality of inwardly projecting retainer tabs for securing the bearing retainer in a fixed location relative to a vacuum cleaner motor housing and a bearing assembly, said bearing assembly being mounted on a motor shaft, which motor shaft projects through said vacuum cleaner motor housing.

15 Claims, 3 Drawing Sheets

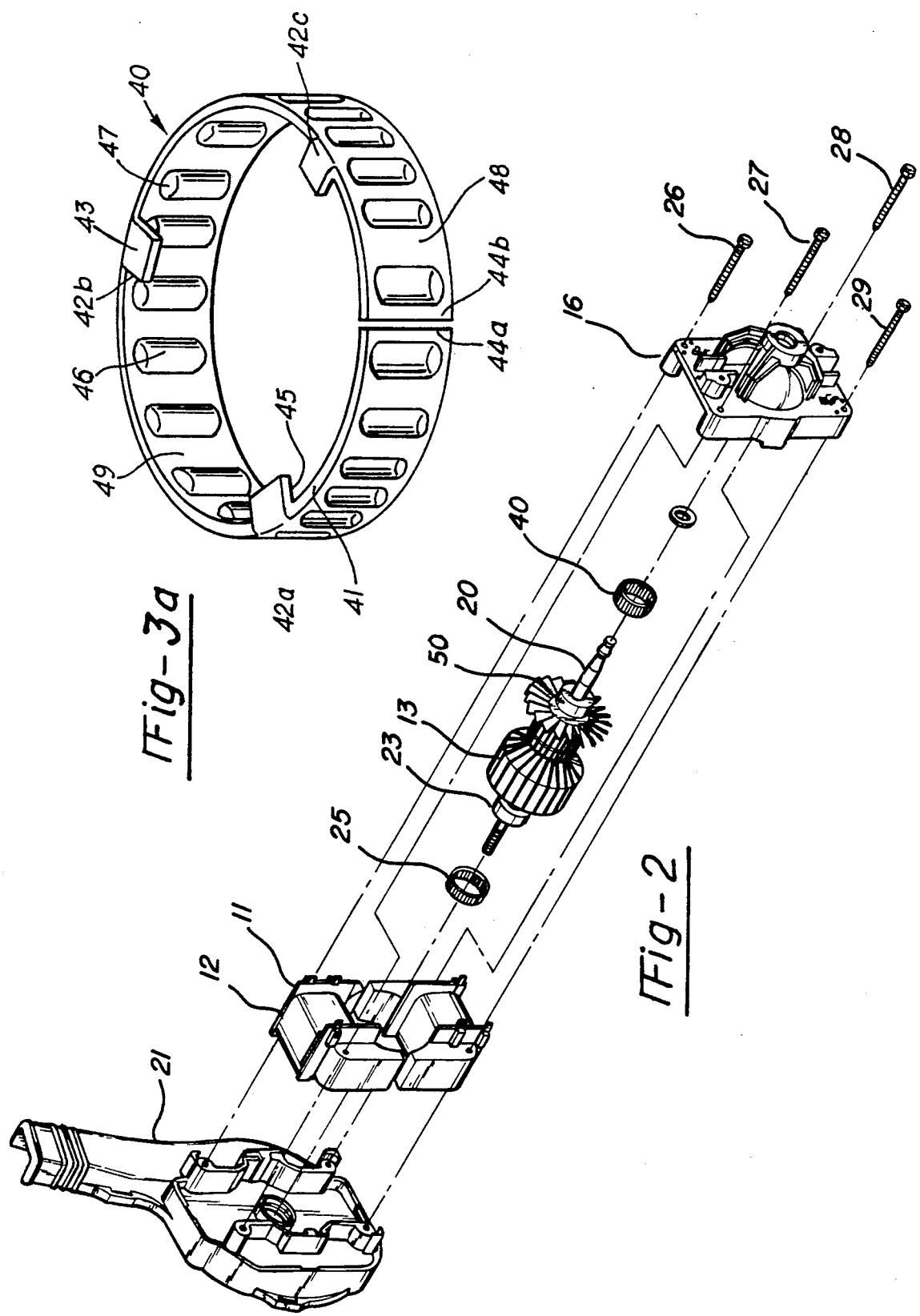

BEARING RETAINER FOR A VACUUM CLEANER MOTOR

BACKGROUND OF THE INVENTION

1. Field of the Invention

The present invention relates to a bearing retainer for a vacuum cleaner motor, and more particularly to a bearing retainer for toolless insertion within a motor housing which reliably secures a stock bearing assembly within the motor housing with no additional machining steps, bearing mounting parts or added processing required.

2. Description of the Prior Art

In conventional form, one-piece corrugated bearing retainers for securing a motor shaft bearing assembly within a motor housing are well known. An example of such a retainer is that made and sold under the commercial name USA Tolerance Rings Part No. ANL 22X7-S. Such bearing retainers typically are formed of stainless steel in an elongated rectangular shape, and are sufficiently flexible at room temperature to permit them to be deformed into an annular shape for toolless insertion into a motor housing.

A previously unresolved problem, however, has limited their usefulness in securing bearings subject to the high shaft speeds, high frequency vibrations, and the bearing housing draft angles encountered in vacuum cleaner motor applications. The drawback to current corrugated bearing designs is that there is a tendency to "creep" from between the bearing and the associated housing, thus causing the bearing to become displaced or misaligned in the housing, thereby causing premature bearing or motor failures.

Previous attempts at solving the generic problem of securing a bearing retainer within a housing can be found on bearing retainers of the non-corrugated type. One prior art solution is to use the bearing retainer to physically block the path of the bearing assembly to prevent escape from the motor housing. Another prior art solution is the use of spring tension to secure the bearing within the motor housing. The latter solution is unsatisfactory, however, since it typically requires the use of metal not found in the present bearing retainer capable of generating large spring forces, and the bearing retainer tends to lose spring force over time. The former solution is unsatisfactory in a corrugated bearing retainer since it requires costly additional machining to the bearing assembly, motor housing, or both.

U.S. Pat. Nos. 4,710,037, 4,364,615 and 4,236,767 are examples of bearing retainers using spring force to secure the bearing within the hub or housing. U.S. Pat. No. 4,710,037 includes the additional disadvantage of requiring a tool for assembly, and U.S. Pat. No. 4,364,615 has the additional disadvantage of requiring machining of the housing, as shown in FIG. 7. The spring shown in U.S. Pat. No. 4,236,767 is integral to the bearing, and obviously not useable with a stock bearing assembly.

U.S. Pat. Nos. 4,545,627 and 1,906,521 disclose bearing retainer devices using snap rings fit in a groove located in the bearing or the housing. These designs have the disadvantage of requiring additional machining of the bearing or the housing, and further do not compensate for manufacturing tolerances between the bearing and housing.

The present invention overcomes these problems of prior bearing retainer devices in a novel and simple manner.

SUMMARY OF THE INVENTION

In the present invention, a bearing retainer is provided that overcomes the disadvantages of prior bearing retainer devices. The present invention includes a corrugated rectangular metal strip formable into an annular shape capable of insertion within a motor housing. Alternatively, the metal strip may be formed in any shape conforming to the interior wall of the motor housing which receives the bearing. The strip includes on one edge a plurality of integral tabs, formed such that the tabs project inwardly when the retainer is formed in an annular shape.

When installed, the bearing retainer is received within a motor housing with the edge having inwardly projecting tabs resting against the rear wall of the motor housing. Alternatively, the bearing retainer may include inwardly projecting tabs spaced from the edge which rests on the rear wall of the motor housing. The insertion of the bearing retainer is achieved by hand with no additional steps, tools or machining of the housing required. The invention may be employed with bearing assemblies of several commercially available types, for example, ball bearing assemblies, roller bearing assemblies, needle bearing assemblies or sintered metal bearing assemblies. An example of a bearing assembly with which the invention may be employed is a bearing assembly of the type sold under the commercial name Nippon Seiko KK Type 608.

The bearing assembly, which is itself securely fastened to the motor shaft, is inserted into the bearing retainer and thereby securely retains the tabs between the bearing housing and the motor housing and consequently firmly retains the bearing retainer within the motor housing. An advantage of the present invention is that relies on the constant axial relationship between the motor shaft, the bearing assembly and the motor housing to maintain the bearing retainer in position, therefore, the bearing retainer may be used with any motor housing material.

An object of the present invention is to provide a bearing retainer for reducing tolerance between the bearing assembly and the motor housing. A further object is to provide a bearing retainer capable of remaining secure within the motor housing at minimal expense of material and labor. A further object of the invention is to provide a bearing retainer insertable and removable from the motor housing without the use of tools. A still further object of the invention is to provide a bearing retainer usable with a commercially available standard bearing assembly requiring no modification thereto. A still further object of the invention is to provide a bearing retainer usable in motor housings of varying materials, including molded plastic, die cast metal or sheet metal.

These are other object, advantages and novel features of the present invention, as well as details of an illustrated embodiment thereof, will be more fully understood from the following description and drawing.

BRIEF DESCRIPTION OF THE DRAWINGS

FIG. 2 is an exploded view of the motor and motor bracket assembly shown in FIG. 1;

FIG. 3a is an enlarged perspective view of the bearing retainer shown in FIG. 3 constructed in accordance with the principles of the present invention.

DESCRIPTION OF THE PREFERRED EMBODIMENT

Figure 1:
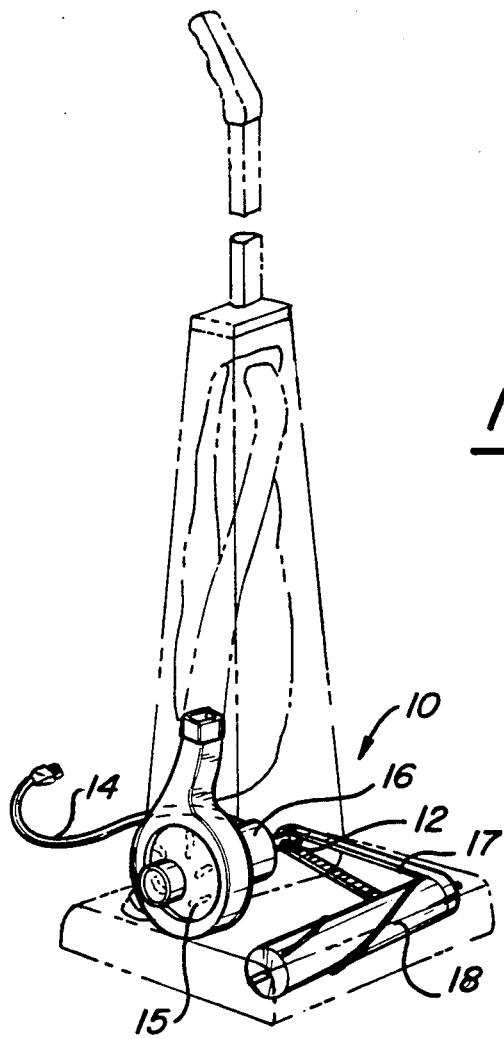
FIG. 1 is a perspective view of a vacuum cleaner constructed in accordance with the principles of the present invention.

A vacuum cleaner 10, as shown in FIG. 1, constructed in accordance with the principles of the present invention, includes a motor assembly 12 having a motor (not shown) and a motor bracket 16 for mounting the motor to the vacuum cleaner 10. The motor is further supported and located within vacuum cleaner 10 by yoke 15. Power cord 14 supplies power to the motor. The motor is employed to drive an endless belt 17 which in turn drives beater brush 18.

As shown in FIG. 2, motor assembly 12 includes a frame and stator assembly 11 and a rotor assembly 13. Rotor assembly 13 includes a journaled shaft 20 which extends through and is supported by motor bracket 16. Shaft 20 freely rotates within motor bracket 16 to drive beater brush 18.

Bearing assembly 50 is mounted in a fixed axial location on shaft 20. A bearing retainer 40 employing the present invention is placed within motor housing 16 which receives shaft 20 and bearing assembly 22 in a conventional and well-known fashion. Similarly, bearing assembly 23 is mounted in a fixed axial location on shaft 20 and is received within bearing retainer 25 employing the present invention. Bearing retainer 25 is located and retained in yoke end portion 21. The motor assembly 12 and motor bracket 16 are secured to yoke end portion 21 by fasteners 26, 27, 28 and 29 in a conventional and well-known fashion.

Figure 3:
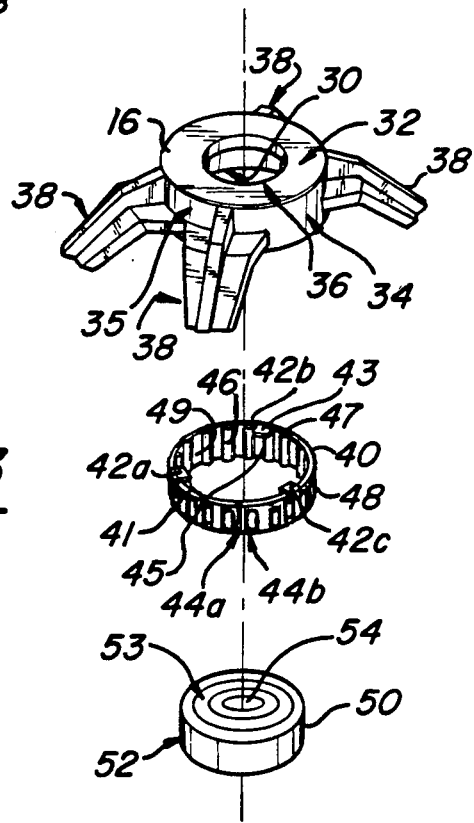
FIG. 3 is an exploded view of the bearing assembly and bearing retainer incorporated in the motor bracket assembly shown in FIG. 2.

As shown in FIG. 3, the motor bracket or housing 16 includes an interior relieved portion defined by a rear wall 32 and a side wall 34. Side wall 34 includes a cylindrical interior wall 30 and an exterior wall 35. Rear wall 32 includes a concentric bore 36 for receiving motor shaft 20. Side wall 34 is supported from the motor bracket by support arms 38. The motor bracket 16 is preferably formed from cast metal or cast or molded plastic material.

Bearing retainer 40 is formed from a rectangular piece of corrugated metal having end portions 44a and 44b. Bearing retainer 40 is preferably formed of stainless steel and, in its preferred embodiment, has tabs 42a, 42b and 42c projecting inwardly from one edge thereof. Corrugated or raised portions 46 are placed transversely at evenly spaced intervals along the length of bearing retainer 40. In the preferred embodiment, raised portions 46 consist of a transversely extending elongate ridge 47.

When installed, bearing retainer 40 is placed on edge relative to motor bracket side wall 34 and formed in the shape of an annular upstanding wall. When so formed, end portion 44a meets end portion 44b and bearing retainer 40 includes an exterior motor bracket-engaging wall 48 and an interior bearing assembly-engaging wall 49. Tabs 42a, 42b and 42c protect inwardly from distal edge 41 and have an exposed upper face 43 and an exposed lower face 45. Preferably, retainer tabs 42a, 42b and 42c are formed at a right angle to the upstanding wall.

Bearing assembly 50 is well-known and old in the art, having an annular exterior wall 52, upper face 53 and an annular interior, motor shaft engaging wall 54. As may be readily apparent from FIG. 3, the interior relieved portion of motor bracket 16 coaxially receives bearing retainer 40, and bearing retainer 40 coaxially receives bearing assembly 50, to form a completed motor shaft support structure 60, as shown in FIGS. 4–6.

Figure 4:
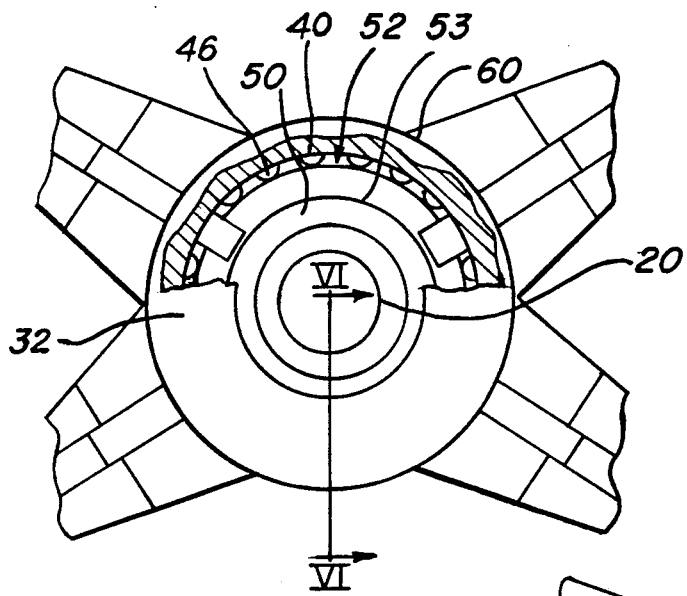
FIG. 4 is a partial cutaway view and bottom view of the motor bracket assembly shown in FIG. 3.
Figure 5:
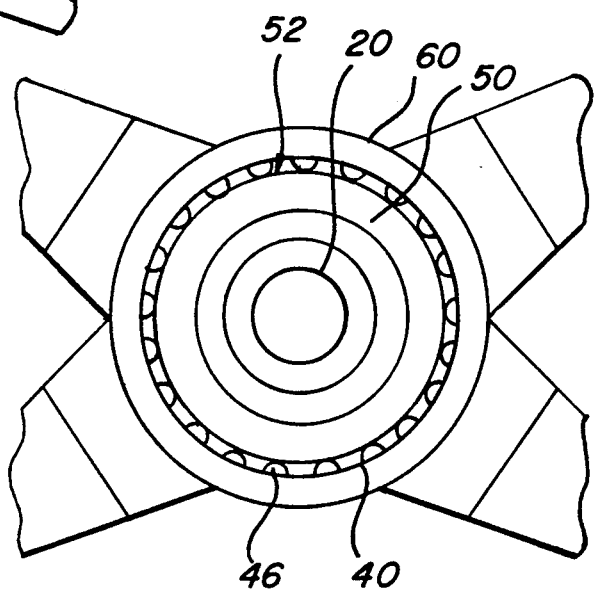
FIG. 5 is a top view of the motor bracket assembly shown in FIG. 3.
Figure 6:
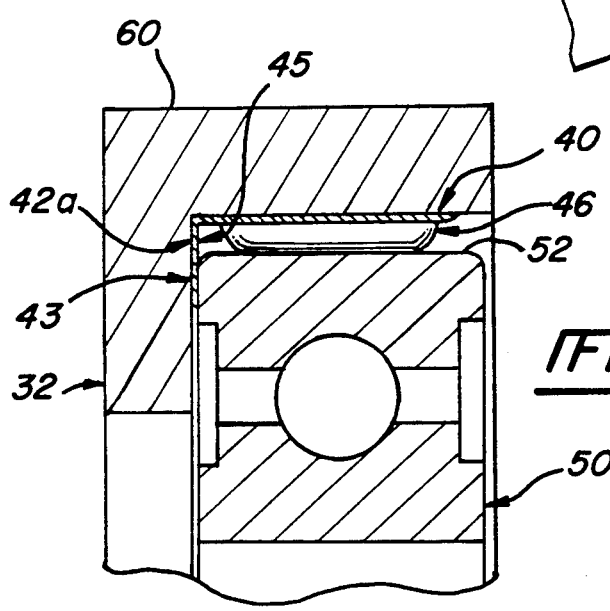
FIG. 6 is a partial section view taken along line VI—VI in FIG. 4.

As shown in FIGS. 4–6, bearing assembly 50 is securely axially located on motor shaft 20. Raised portions 46 of bearing retainer 40 engage exterior wall 52 of bearing assembly 50, thereby reducing or eliminating tolerance between motor bracket interior wall 30 and bearing assembly 50. Upper face 53 of bearing assembly 50 engages the lower face 45 of tabs 42a–42c, and rear wall 32 of motor bracket 16 engages upper face 43 of tabs 42a–42c.

Thus assembled, bearing retainer 40 is firmly secured in position, thereby resisting the normal vibrations and other forces tending to dislodge it from motor housing 16. As a result, bearing assembly 50 and motor shaft 20 are securely retained in motor housing 16, thus preventing the early failure of the motor due to undesired dislodging of the bearing assembly 50 from motor housing 16.

Obviously, many modifications and variations of the present invention are possible in light of the above teachings. Accordingly, it is to be understood that, within the scope of the appended claims, the invention may be practiced otherwise than as specifically described hereinabove.

What is claimed:

1. A bearing retainer for retaining a bearing assembly within a housing comprising:
   an annular body for insertion within said housing,
   said annular body including an upstanding wall defining an interior area for receiving said bearing assembly and for spacing said bearing assembly from said housing,
      said upstanding wall having a plurality of raised portions for retaining said bearing assembly within said housing,
      said upstanding wall having a distal edge for engaging an interior wall of said housing, and
      said upstanding wall including at least one retainer tab projecting from said upstanding wall to maintain said annular body in a predetermined location within said housing.

2. The bearing retainer as defined in claim 1, wherein said plurality of raised portions project from an interior periphery of said upstanding wall for engaging said bearing assembly.

3. The bearing retainer as defined in claim 2, wherein said at least one retainer tab nominally defines a right angle relative to said upstanding wall.

4. The bearing retainer as defined in claim 3, wherein said at least one retainer tab projects from said distal edge of said upstanding wall.

5. The bearing retainer as defined in claim 4, wherein said at least one retainer tab projects inwardly from said upstanding wall.

6. The bearing retainer as defined in claim 5, wherein said annular body is formed from a nominally flat rectangular metal strip.

7. The bearing retainer as defined in claim 6, wherein said annular body is formed of stainless steel.

8. A bearing locating and retaining assembly comprising:
- a nominally cylindrical bearing assembly having a circular cross-section and an annular exterior wall,
- a housing including a relieved portion having an annular interior side wall and a rear wall for receiving and retaining said bearing assembly,
- a bearing retainer having an upstanding annular wall for insertion between said housing interior side wall and said bearing assembly,
- said upstanding annular wall including a distal edge for abutting said housing rear wall,
- a plurality of retainer tabs projecting from said annular body to maintain said annular body in a predetermined location within said housing.

9. The bearing locating and retaining assembly as defined in claim 8, wherein said plurality of retainer tabs are releasably captured between said bearing assembly and said housing rear wall.

10. The bearing locating and retaining assembly as defined in claim 9, wherein said plurality of retainer tabs nominally define a right angle to said upstanding annular wall.

11. The bearing locating and retaining assembly as defined in claim 10, wherein said plurality of retainer tabs project inwardly from said upstanding annular wall.

12. The bearing locating and retaining assembly as defined in claim 11, wherein said plurality of retainer tabs abut said housing rear wall.

13. The bearing retainer as defined in claim 12, wherein said annular body is formed from a nominally flat rectangular metal strip.

14. The bearing retainer as define in claim 13, wherein said annular body is formed of stainless steel.

15. An improved bearing retainer for retaining a bearing assembly within a housing including an annular body for inserting within said housing, said annular body including an upstanding wall defining an interior area and including a rear wall for receiving said bearing assembly and for spacing said bearing assembly from said housing, said upstanding wall having a plurality of raised portions for retaining said bearing assembly within said housing, and said upstanding wall having a lower edge for engaging an interior wall of said housing, the improvement comprising, providing at least one retainer tab projecting interiorly into said annular body at a nominally right angle from a distal portion of said upstanding wall and abutting said rear wall to maintain said annular body in a predetermined location with said housing.

* * * * *